United States Patent [19]

Togashi et al.

[11] Patent Number: 5,051,159
[45] Date of Patent: Sep. 24, 1991

[54] NON-WOVEN FIBER SHEET AND PROCESS AND APPARATUS FOR ITS PRODUCTION

[75] Inventors: Ryoichi Togashi, Shiga; Katsutoshi Ando, Otsu, both of Japan

[73] Assignee: Toray Industries, Inc., Tokyo, Japan

[21] Appl. No.: 554,774

[22] Filed: Jul. 19, 1990

Related U.S. Application Data

[63] Continuation of Ser. No. 333,882, Apr. 4, 1989, abandoned, which is a continuation of Ser. No. 47,346, May 8, 1987, abandoned.

[30] Foreign Application Priority Data

May 9, 1986 [JP] Japan .................................. 61-104773

[51] Int. Cl.$^5$ .............................................. H05F 3/00
[52] U.S. Cl. ...................................... 204/165; 264/22; 55/155
[58] Field of Search ............... 204/165, 168, 169, 131; 55/155, DIG. 39; 264/22, 23, 24, DIG. 47, DIG. 48; 425/174.6, 174.8 E

[56] References Cited

U.S. PATENT DOCUMENTS

| | | | |
|---|---|---|---|
| 2,168,027 | 8/1939 | Gladding | 425/174.8 E |
| 2,466,906 | 4/1949 | Miller | 264/24 |
| 3,319,309 | 5/1967 | Owens | 425/174.8 E |
| 3,655,307 | 4/1972 | Hawkins | 264/24 |
| 3,860,369 | 1/1975 | Brethauer et al. | 264/22 |
| 4,069,026 | 1/1978 | Simm et al. | 55/155 |
| 4,127,706 | 11/1978 | Martin et al. | 264/22 |
| 4,215,682 | 8/1980 | Kubik et al. | 425/174.8 E |
| 4,323,525 | 4/1982 | Bornat | 264/22 |
| 4,592,815 | 6/1986 | Nakao | 204/165 |
| 4,666,395 | 5/1987 | Shah | 425/174.8 E |

FOREIGN PATENT DOCUMENTS 182512 5/1986 European Pat. Off. .
196223 11/1984 Japan .

Primary Examiner—John F. Niebling
Assistant Examiner—Steven P. Marquis
Attorney, Agent, or Firm—Armstrong, Nikaido, Marmelstein, Kubovcik & Murray

[57] ABSTRACT

A process apparatus for producing a non-woven, especially a non-woven electret, fiber sheet provides for directing the non-woven fibers at a collecting surface and into an electric field between at least one electrode and the collecting surface.

This process, in which the fibers are collected in the electric field, enables the economical production of a non-woven electret fiber sheet of single layer structure having large amount of polarized charges (giving a total electric charge per unit area of at least $7 \times 10^{-11}$ Coulomb/cm$^2$), and a weight of at least 60 g/m$^2$, preferably greater than 80 g/cm$^2$.

The non-woven electret sheet may have the large amount of electret charge throughout its thickness and/or a uniform weight distribution and thus have excellent dust collecting properties.

12 Claims, 3 Drawing Sheets

NON-WOVEN FIBER SHEET AND PROCESS AND APPARATUS FOR ITS PRODUCTION

This application is a continuation of application Ser. No. 333,882, filed Apr. 4, 1989, now abandoned, which is in turn a continuation of application Ser. No. 047,346, filed May 8, 1987, now abandoned.

BACKGROUND OF THE INVENTION

1. Field of the Invention

This invention relates to a novel non-woven electret fiber sheet useful, for example, as a filter, and to a process and apparatus for producing such a sheet which, even after loss of its electret properties, still retains adequate filtration properties by virtue of the uniform dispersion of its constituent fibers provided by the process and apparatus.

2. Description of Prior Art

A process of producing an electret sheet consisting of extremely thin fibers is disclosed in U.S. Pat. No. 4,215,682.

The process comprises subjecting a molten polymer to a melt-blow spinning, rendering the formed fibers electret (electretizing) immediately after the melt-blow spinning by passing them through an electrical field formed between two non-contact voltage-application electrodes disposed near the spinneret, and collecting the electret fibers on a collecting apparatus. In this process, electretizing is started after spinning and completed before the collection of the fibers.

However, this process has several drawbacks.

A. Since the electric charge is applied to the fibers without contacting them with an electrode, that is, the electric field acts on the fibers flying in space, a sufficient amount of electric charge cannot be trapped within the fibers.

B. The amount of trapped charge in the sheet is not large since, perhaps, the direction of polarity of each fiber is randomized before collection and the sheet as a whole has almost no polarity.

C. The flying speed of the melt-blown fibers is as high as 150 m/second. Thus the fibers stay in the electric field only for an instant, sufficient amount of electric charge cannot be trapped.

D. Since the fibers electretized immediately after the melt-blow spinning, part of the electric charge escapes due to the thermal movement of the component molecule of the fibers.

Because of the above drawbacks, the amount of the electric charge trapped in the electret sheet is small, and the stability of the electret is poor.

U.S. Pat. No. 4,592,815 discloses a process of producing an electret non-woven sheet comprising placing a non-woven sheet on a grounded plate, and subjecting the non-woven sheet to corona discharge thereby trapping electric charge in the non-woven sheet and causing ionic depolarization.

Similarly, EP-A-0182512, which was published after the priority date of the present application, describes a process for producing an electret fiber sheet in which a preformed fiber sheet having a covering factor of at least 60% is placed between mutually non-contact and earth electrodes and a voltage of at least 3 KV/cm, at an electric current density of at least $1 \times 10^{-6}$ mA/cm$^2$, is applied between the electrodes.

However, for the reasons described below, these process are applicable only to the formation of sheets of relatively low thickness and therefore relatively low weight. Thus the process of EP-A-0182512 is limited for the production of electret fiber sheets having a weight no more than 80 g/m$^2$.

EP-A-0182512 also contains a general disclosure of electret fiber sheets having a total polarized charge per unit area of at least $7 \times 10^{-11}$ Coulomb/cm$^2$, but no disclosure that this applies to sheets of all disclosed weights especially those of highest weight.

Thus, processes such as those described in U.S. Pat. No. 4,592,815 and EP-A-018512 suffer from the disadvantage that the electretic character of the sheet is decreased as the weight of the sheet increases. This is because, although a large amount of electric charge generated by the corona discharge is implanted into the surface portion of the sheet, the relative amount of the electric charge reaching the internal portion of the sheet becomes small since the surface portion acts as a barrier.

Another problem encountered in a process of producing a non-woven sheet (whether it is an electret sheet or not) by melt-blow spinning is that if the weight of the collected fibers increases, the amount of air flowing through the wire net is decreased, so that the air flow is reflected by the collecting surface thus causing a turbulent flow. This brings about an irregularity in the weight of the sheet and tangles the fibers.

The invention seeks to provide a solution to such problems.

SUMMARY OF THE INVENTION

This invention provides, according to one aspect, an electret fiber sheet having a total electric charge per unit area of at least $7 \times 10^{-11}$ Coulomb/cm$^2$, which sheet is a single layer structure having a weight of at least 60 g/m$^2$, preferably at least 80 g/m$^2$, especially at least 100 g/m$^2$. It is especially preferred that the electric charge is provided by polarized charges having an ordered orientation across the thickness of the sheet.

Another aspect of the invention provides a process for producing a non-woven fiber sheet, especially an electret fiber sheet, directing the non-woven fibers at a collecting surface, providing an electric field between at least one electrode and the collecting surface and collecting the non-woven fibers on the collecting surface within the electric field.

This process provides a simple method of producing a non-woven sheet having a large amount of electret charge trapped within it and/or uniform weight distribution thus providing the sheet with excellent dust collecting properties.

This invention additionally provides apparatus for carrying out such a processes, which apparatus comprises a collector for providing the fiber-collecting surface, means for directing the fibers at the collecting surface, and at least one electrode arranged relative to the collecting surface, so as to be capable of providing an electric field between the or each electrode and the collector, whereby the fibers are collected in the electric field.

DESCRIPTION OF THE PREFERRED EMBODIMENTS

Figure 1:
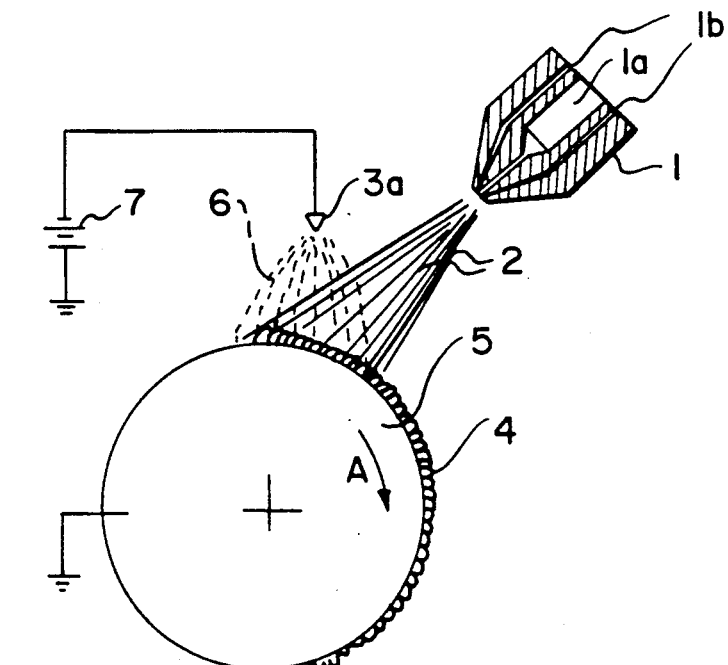
FIGS. 1 to 3 are schematic cross-sectional views showing respective preferred embodiments of apparatus for producing a non-woven sheet of the present invention.

Referring to FIG. 1, a melt-blow spinneret 1 has a polymer flow channel 1a into which molten polymer is introduced by an appropriate extrusion apparatus (not shown) and an air flow channel 1b into which heated and compressed air is introduced. The air and polymer are simultaneously blown out from the melt-blow spinneret 1. The spun fibers 2 thus formed are blown into an electric field (denoted by schematic lines 6) formed between a non-contact electrode 3a and a collecting surface (contact electrode or earth electrode) provided by collecting apparatus 5. The non-contact electrode 3a is provided at an appropriate position above the collecting surface of the collecting apparatus 5. The spun fibers 2 accumulate on the collecting surface and thus form, within the electric field, a non-woven sheet 4, which is then transported by the collecting apparatus 5 rotating in the direction indicated by the arrow A, to obtain a desired non-woven sheet. Depending upon the material of the fiber and the process employed, the sheet 4 may or may not be an electret sheet.

By "non-contact electrode", we mean any electrode which is used to impart to a sheet electric charge while maintaining a gap between it and the sheet, which gap may be occupied by a fluid medium such as air.

Figure 2:
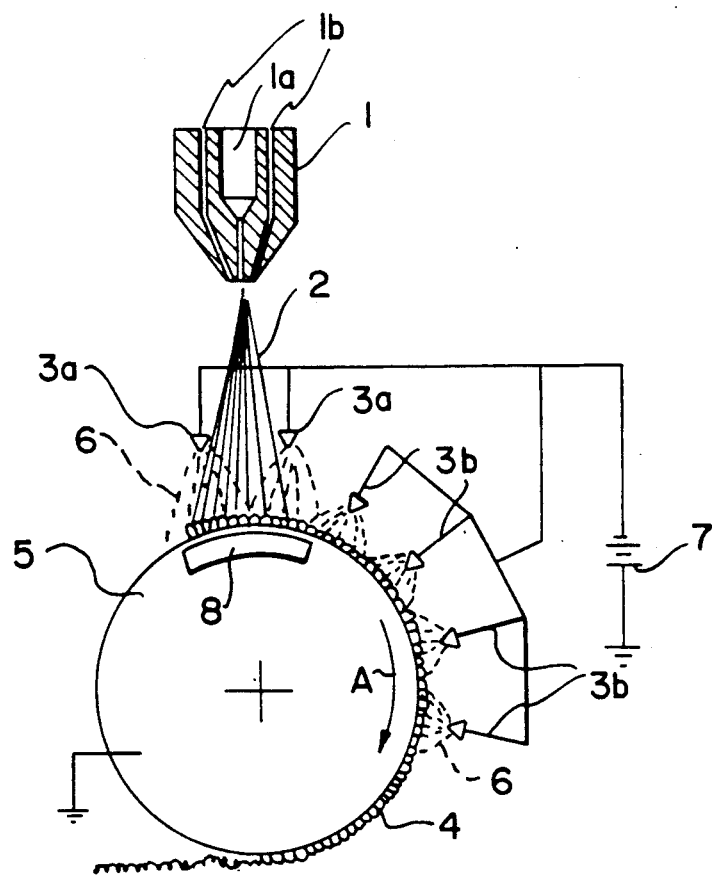

FIG. 2 shows an embodiment in which the meltblown fibers 2 are electretized, simultaneously with the collection of the fibers, by a plurality of electrodes 3a to which a high voltage is applied, and the collected fibers are further electretized by electrodes 3b disposed around the collecting apparatus to further promote the electretic property.

This embodiment additionally includes an air-suction apparatus 8.

This apparatus is particularly useful for providing a uniform sheet, the weight of which exceeds about 60 g/m², especially more than about 80 g/m², more especially more than 100 g/m².

Figure 3:
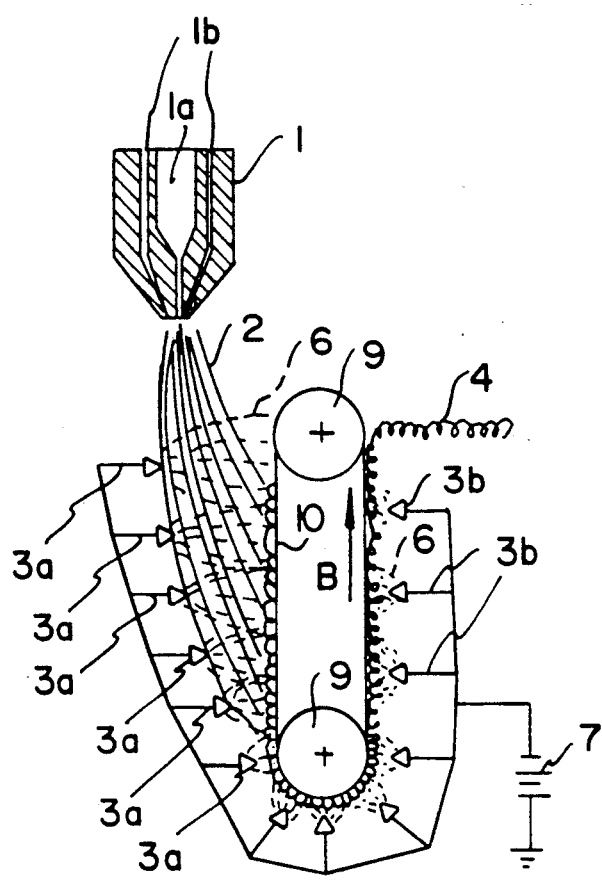

FIG. 3 shows an embodiment in which the fibers 2, melt-blown in a direction substantially parallel with the direction B of travel of a metal belt 10 driven by a pair of continuously rotating driving rolls 9, are collected on the metal belt 10. This apparatus exploits the adhesivity of the fibers 2 imparted by electrification by the electrodes 3a disposed around the metal belt.

The electretic property may be further promoted by providing electrodes 3b at the opposite side of the driven metal belt 10, and by retaining the collected fibers for a long time in the electric field 6 formed by the electrodes 3a and 3b.

by the process carried out using the apparatus shown in FIG. 3, a sheet with an excellent electret stability may be obtained because the fibers are collected on the grounded metal belt which acts as a contact electrode, so that a electric charge may be easily obtained.

After collecting the fibers by the processes using the respective apparatus shown in FIGS. 1 to 3, the rearside of the non-woven sheet (i.e., the side which contacts with the collecting apparatus) may be electretized additionally by successively transferring the sheet to a separate roller or conveyer so that the rear surface becomes the front surface on the separate roller or conveyer and then charging the surface with a needle electrode of a polarity opposite to that used for electretizing the fibers at the time of collection, to provide a more excellent electret sheet.

One of the characteristic effects of the process of the present invention is that a non-woven sheet with a high general uniformity, especially of weight, fiber orientation and amount of electric charge per unit area, may be obtained.

Another characteristic effect of the process of the present invention is that the obtained electret sheet may be substantially uniformly electretized from the inner layer to outer layer of the non-woven sheet, and thus the process makes it possible to produce a novel electret sheet with excellent stability and electretic character even if the thickness is large. However, the method of this invention can be effectively applied for producing a non-woven sheet of any desired thickness.

This will now be explained more fully, with reference firstly to the high general uniformity, especially uniformity of weight.

The known collecting method used in a melt-blow process comprises melt-blowing fibers on to a metal belt such as wire net together with air, separating the fibers from the air on the wire net, and collecting the fibers. In this method, when the air flow passing through the wire net is decreased due to the increase of the weight of the non-woven sheet on the wire net, a reflection flow (turbulent flow) of air is generated on the non-woven sheet. This brings about a tangling of the fibers and irregularity in the weight of the sheet. To overcome this problem, it has been proposed to place an air-suction apparatus under the wire net. However, if the fibers have a diameter of not more than 5 μm, this countermeasure is not very effective.

By the process of the present invention, the fibers strongly adhere to the collecting surface because it additionally serves as an earth electrode or charged electrode. Hence the reflecting air cannot move the fibers. Accordingly a sheet with high uniformity may be obtained even when the weight of the non-woven sheet is increased and even when the diameter of the fiber is small. For example, the process is especially suitable for producing non-woven fiber sheets in which the average diameter of the fibers is no greater than 5 μm.

Thus the process of the invention may results in a non-woven fiber sheet which is not electret, or which loses its charge after a period of time, or from which the charge may be removed, for example, by immersion in an organic liquid. However, such a sheet, formed within a electric field by a process in accordance with the invention may still be useful as a filter having at least adequate particle collecting efficiency of, for example, at least 65% and possibly as high as 95% or higher, and should still have greatly reduced weight variation as compared with sheets prepared by conventional, especially fiber-blowing process. The unevenness in weight of a sheet made by a process of the invention should be such as to provide a weight variation of no more than 8%, when expressed in terms of the CV (Coefficient of Variation) value, later defined. Such a low weight variation may be achieved by a process of the invention even when the weight of the sheet is as low as 20 g/m².

It is especially preferred that the field strength (the value obtained by dividing the applied voltage by the minimum distance between the electrode and the collecting surface) of the electric field be not less than 1 KV/cm. A field strength of this value imparts a sufficient adhesion effect to the fibers to provide highly uniform non-woven sheets from a wide range of fiber materials, irrespective of their volume resistivity.

The reason why the process of the present invention makes it possible to produce a thick electret sheet substantially uniformly electretized throughout its thickness will now be explained.

At the instance of the arrival of the fibers at the collecting surface, electric charge is implanted into the fibers. Next, the collected fiber layer works as a collecting surface electrode for succeeding fibers. Thus, electric charge is also implanted into the fiber layer subsequently collected on the first collected fibers. In this manner, electric charge is trapped in turn in the lower, middle and then upper layer as the collection of the fibers proceeds, so that a uniform electret charge throughout the thickness may be obtained.

Further, since the degree of electretization is influenced by the moving speed (rotation speed) of the collecting surface, and, usually, this moving speed is not high, the amount of the trapped electric charge can be easily increased.

Further, since electric charge is implanted into to well solidified fibers (below the melting point of the material), not to the melted fibers immediately after the spinning, the amount of the implanted electric charge may be increased. Thus, an excellent electret sheet may be obtained.

The material of the fibers utilized for producing the electret sheet of this invention preferably has a volume resistivity of not less than $10^{10} \Omega \cdot cm$ (determined in accordance with JIS-C2103).

To impart better electretic property, it is suitable to use a material with a volume resistivity of not less than $10^{14} \Omega \cdot cm$. This is preferred because the trapped electric charge may be stably retained in the fibers.

However, a non-woven sheet with high uniformity may be obtained by employing a polymer of any volume resistivity, such as polyolefins, polyesters, polyamides, polycarbonates, fluorine-containing polymers, polyurethanes or vinyl chloride polymers, such as polypropylene, polyethylene, Nylon 6, Nylon 66, polyethylene terephthalate and polycarbonates, especially when the fibers are collected in an electric field of a strength of not less than 1 KV/cm.

The collecting surface may, for example, be a metal plate, having a few or a large number of holes. Conveyers or drum rolls made of wire net or a metal plate may also be used.

If the collecting apparatus is used in combination with an air-suction apparatus, a wire net, or metal plate having many holes, is preferably used.

Further, it is preferred to cover the collecting surface with a material consisting polyethylene or polypropylene of which the volume resistivity is adjusted to $10^{-3}$ to $10^9$ $\Omega \cdot cm$ by incorporating therein by kneading an electroconductive substance such as carbon powder, a surface active agent, or a metal oxide, or with a material having a volume resistivity of not less than $10^{14} \Omega \cdot cm$, consisting of, for example, polyethylene, polypropylene, polyester or nylon. This enables a high DC voltage to be imparted without glow discharge.

The non-contact electrode preferably has a shape such as to provide an edge or a point, for example, a wire shape, knife shape or needle shape. Usually, the electric field is formed between at least one non-contact electrode and the collecting surface which is grounded for the operator's safety. However, a higher charge may be imparted by simultaneously applying to the collecting surface a voltage of a polarity opposite to that applied to the electrode (i.e. the collecting surface is not grounded). By this method both of the positive and negative electric charges may be implanted into the fibers.

The process of producing a non-woven sheet of the present invention may be applied to any of several fiber-forming processes in which short fibers are blown with air and collected, for example, flush spinning (fiber forming method in which fiber forming polymer solution or emulsion is disrupted with high pressure liquid medium from a small hole), spin-bonding (direct and continuous sheet formation from spun filaments), tow-opening and melt-blowing. Among them, the melt-blow process is especially advantageous, because the diameter of the fibers produced is extremely small.

The process of the present invention may be used to obtain an electret fiber sheet having a total amount of trapped electric charge of at least $7 \times 11^{-11}$, preferably at least $1 \times 10^{-10}$ Coulomb/cm². It is also preferred that the surface polarized charge per unit area be at least $7 \times 10^{-11}$, more preferably at least $1 \times 10^{-10}$.

An electret sheet having this amount of electric charge can be used satisfactorily, and the trapped electric charge does not escape completely from the fibers even if the sheet is immersed in methanol.

The suitable distance between the spinneret and the collecting surface varies depending on the purpose of the production. Specifically, in the melt-below spinning process, in order to produce a uniform non-woven sheet, it is preferred that the collecting surface be located far enough from the spinneret to solidify the fibers. The distance is usually about 5 to 100 cm.

Temperature is an important factor in producing an electret sheet. For example, for obtaining an excellent electret sheet by melt-blow spinning process using polypropylene, it is preferred to locate the collecting surface at a portion where the temperature of the fibers is reduced to 100° C. or less. If the temperature of the fibers is higher than this at the collecting surface, a sufficient amount of electric charge cannot be trapped.

The processing speed varies depending on the weight of the collected fibers, voltage applied, temperature of the fibers, the number of electrodes and material used. Usually a processing speed of about 1 m/min. to 250 m/min. may be applied.

The distance between the electrode and the collecting surface is preferable to be as small as possible, provided that the fibers transported by the fluid do not contact the electrode. The preferred distance is about 1 to 20 cm.

One or more rows of electrodes may be provided so as disposed to cover the whole width of the collected fibers. When needle electrodes are used, it is important to adjust the intervals between the adjacent electrodes depending on the applied voltage and the distance between the electrode and the collecting surface. When the applied voltage is 15 KV or more, the distance between the electrodes may be about 5 cm to 30 cm.

Figure 5:
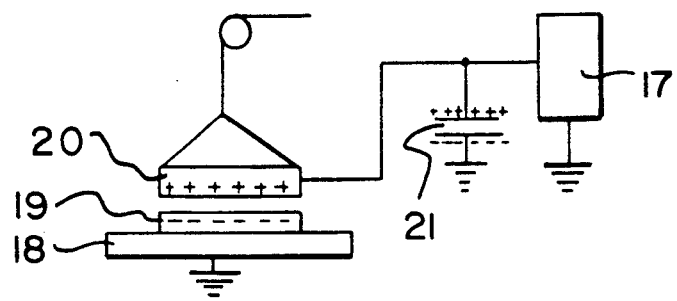
FIG. 5 is a simplified illustration of equipment for measuring the surface charge density of an electret fiber sheet.

Equipment for measurement of the surface charge density is shown in FIG. 5. An electret fiber sheet 19 is placed on an earth metallic plate 18, and another metallic plate 20 is brought into contact with the electret sheet 19 to generate a counter charge in the metallic plate 20 connected to a condenser 21. By reading the voltage of the condenser 21 on volt meter 17, the surface charge density can be calculated as follows.

*Surface charge density* = $C \times V/A$

C: Capacity of condenser (F)
V: Voltage
A: Surface area of the electret sheet (cm²)

The surface charge density has similar effect to the total trapped charge (i.e. total charge density), however it can be determined much more easily than the trapped charge. Therefore it is often convenient to use the former in place of the latter.

Figure 6:
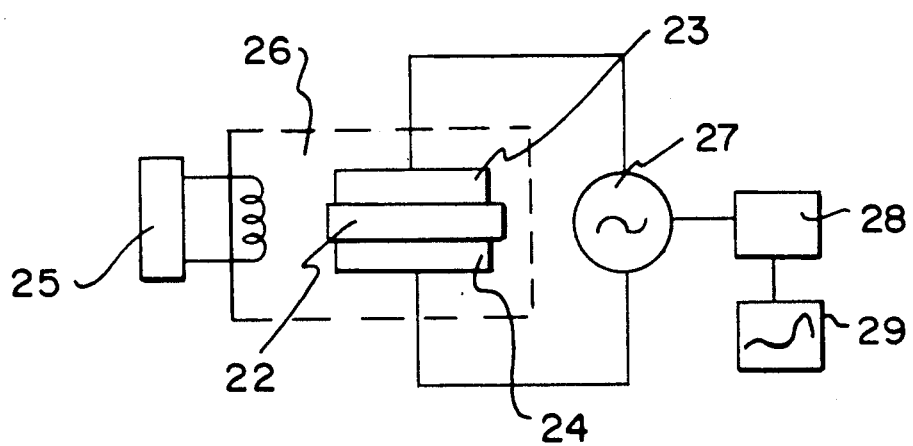
FIG. 6 is a typical illustration showing equipment for measuring the total amount of polarized charge.

Using Thermally Stimulated Deporalization Current Apparatus (Toyo Seiki Co.), as shown in FIG. 6, the measurement of depolarization current versus temperature can be made by strongly nipping an electret fiber sheet 22 (3.14 cm diameter) placed in a heating oven 26 including a temperature controller 25, connected with a high sensitivity ammeter 27. More specifically, as the temperature of the heating oven is raised at a constant rate, for example, at a rate of 5C.°/min from room temperature to a temperature close to the melting point of the sheet, the charges trapped cause electric current due to depolarization thereof. The electric current is recorded by a recorder 29 operated by a data processing unit 28 to obtain a curve of electric current against temperature in various temperature zones. The amount of the trapped electric charge per unit area is the quotient of the area under the current curve divided by the area of the specimen subjected to the measurement.

The curve obtained by plotting depolarization current against temperature may also be used to determine the peak temperature of depolarization of an electret fiber sheet, which temperature is preferably at least 50° C., more preferably at least 80° C.

By the process of the present invention, a non-woven sheet with excellent uniformity may be obtained since the collection of the fibers is conducted in the electric field between the electrode and the collecting surface. Further, since an electret sheet may simultaneously be produced, the invention provides a highly energy-saving process.

The electret sheet produced may be uniformly electretized up to its inner portion since the fibers are electretized at the collecting surface at the time of their collection.

Thus, according to the present invention, an electret sheet with excellent stability of electric charge may be obtained.

The present invention will now be described in more detail by way of the following examples.

EXAMPLE 1

Using the apparatus shown in FIG. 1, polyprolylene having Melt Index 28 (ASTM D1238-65T) was subjected to melt-blow spinning to collect a non-woven sheet of 80 g/m², the average diameter of the fibers being 2 μm, on a collecting surface (30# wire net cylindrical drum) located 25 cm away from the tip of the spinneret. The spinning conditions were as follows:

| | |
|---|---|
| Spinning Temperature | 350° C. |
| Diameter of Spinning Hole | 0.2 mm |
| Output of Polymer per Hole | 0.6 g/min |
| Number of Spinning Holes | 916 |
| Interval of Spinning Hole Centers | 1.2 mm |
| Temperature of Blown Air | 350° C. |
| Quantity of Blown Air | 20 Nm³/min |
| Angle of Blowing Direction relative to Collecting Surface | 40° |
| Number of Needle Electrodes | 11 |
| Distance between Needle Electrodes | 10 cm |
| DC Voltage of Needle Electrodes | −40 KV |
| Distance between Needle Electrode and Collecting Surface | 9 cm |
| Rotation Speed of Collecting Surface | 25 m/min |
| Diameter of Cylindrical Drum | 30 cm |

The needle electrodes were disposed in a line in the width direction of the drum. The fiber temperature on the collecting surface was 60° C.

The weight variation of the non-woven sheet (CV value) was determined for 100 samples of the 10 cm squares taken by cutting the non-woven sheet in the longitudinal direction ten times at 10 cm intervals and then cutting the thus obtained 10 sheets in the direction of width ten times at 10 cm intervals. The weight variation (CV value), defined by the equation given below, was determined by two dimensional diffusion analysis.

$$CV \text{ Value } (\%) = \frac{\text{Standard Deviation}}{\text{Average Weight}} \times 100$$

The CV value for the sheet produced by the above process was found to be 4.5%.

In contrast, for a sheet produced by the same process, but without implanting a voltage to the needle electrode, the CV value was found to be 10%.

By observing SEM photographs of the non-woven electret fiber sheet obtained by the above process, it was proved that the non-woven sheet was free from tangled fibers and was uniform.

The amount of the trapped electric charge was determined to be $2.0 \times 10^{-10}$ Coulomb/cm².

Figure 4:
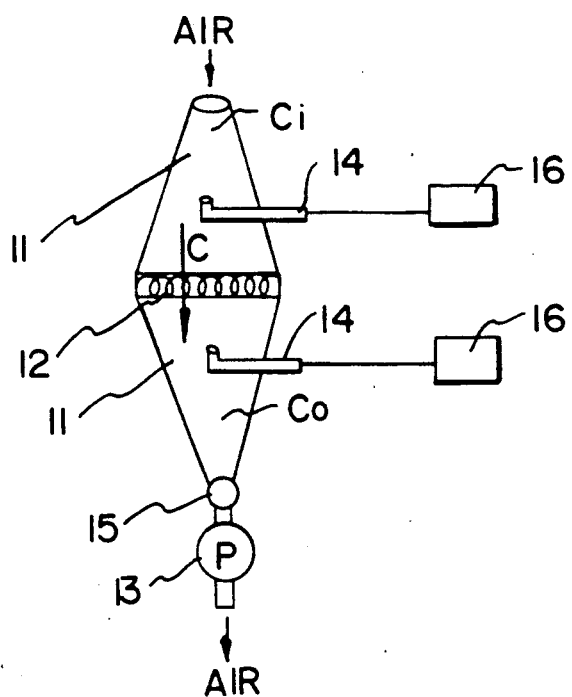
FIG. 4 is a simplified illustration of apparatus for evaluating the efficiency with witch a non-woven fiber sheet catches particles of an aerosol.

The efficiency with which the electret fiber sheet caught particles of an aerosol was evaluated by the following method, described with reference to FIG. 4.

The evaluation was conducted by a method in which the fiber sheet was used as a filter 12 set between upper and lower sample holders 11, respectively. By driving a vacuum pump 13, air, in which particles of an aerosol were introduced, was sucked into an opening at the top of the upper sample holder 11, through the filter 12, and out through an opening at the bottom of the lower sample holder 11.

The flow rate of the sucked air was adjusted to 2.5 cm/sec. by using an air flow meter 15. The evaluated area of the filter was 100 cm².

The aerosol concentrations (Ci and Co) before and after passing through the filter 12 were determined by providing respective aerosol particle collectors 14 in the upper and lower sample holders 11, and, using respective particle counters 16 (CNC: Nippon Canomax Co., Ltd.) to count the number of particles upstream and downstream of the filter 12.

Using the measured values of Ci and Co, the particle collecting efficiency (η) is determined by the following equation:

$$\eta = (1 - Co/Ci) \times 100\%$$

wherein
η: particle collecting efficiency (%)
Ci: aerosol concentration (particles/cm³) upstream of the filter
Co: aerosol concentration (particles/cm³) downstream of the filter The arrow C in the drawing indicates the direction of the air flow.

The determined particle collecting efficiency was 99.998%.

The sheet was immersed in toluene and then dried to reduce the amount of the trapped electric charge to almost zero, i.e., to $3 \times 10^{-12}$ Coulomb/cm².

The aerosol particle collecting efficiency of this sheet was determined and was found to be as high as 97.5%, even after removal of the electric charge.

This shows that an electret sheet with excellent catching efficiency was produced. It was also proved that a non-woven sheet having uniform thickness was produced without using an air suction apparatus.

EXAMPLE 2

Using the apparatus shown in FIG. 2, polyethylene terephthalate having inherent viscosity of 0.65 was subjected to melt-blow spinning to collect a non-woven sheet of 200 g/m², the average diameter of the fibers being 2 μm, on a collecting surface (same as in Example 1) located 25 cm away from tip of the spinneret, while operating an air-suction apparatus under the collecting surface.

| | |
|---|---|
| Spinning Temperature | 370° C. |
| Diameter of Spinning Hole | 0.2 mm |
| Output of Polymer per Hole | 0.5 g/min |
| Number of Spinning Holes | 916 |
| Interval of Spinning Hole Centers | 1.2 mm |
| Temperature of Blown Air | 370° C. |
| Quantity of Blown Air | 22 Nm³/min |
| Angle of Blowing Direction relative to Collecting Surface | 90° |
| Number of Needle Electrodes | 66 |
| Number of Rows of Needle Electrodes | 6 |
| Distance between Needle Electrodes in a Row | 10 cm |
| DC Voltage of Needle Electrodes | −40 KV |
| Distance between Needle Electrodes and Collecting Surface | 9 cm |
| Rotation Speed of Collecting Surface | 2 m/min |
| Diameter of Cylindrical Drum | 100 cm |
| Rate of Air Suction | 100 Nm³/min |

Two of the six rows of the needle electrodes were disposed essentially at a region downstream of the spinneret, so that the fibers directed from the spinneret toward the collecting surface were collected in an electric field provided by the electrodes. The fiber temperature on the collecting surface was 66° C.

The amount of the trapped electric charge was determined to be $1.5 \times 10^{-10}$ Coulomb/cm².

The weight variation (CV value) of the thus obtained non-woven sheet was 4.1%. Observation of SEM photographs of the non-woven sheet proved that it had a very small proportional amount of tangled fibers.

In contrast, when the same process was repeated, but without imparting a voltage to the needle electrode, the CV value was 9% and some tangling of the fibers was observed from SEM photographs.

This Example showed that an electret sheet with excellent uniformity was produced by a process of this invention.

This Example also showed that the collection in an electric field gives an excellent uniformity to the non-woven sheet.

EXAMPLE 3

Using the apparatus shown in FIG. 1, but using a wire electrode in place of the needle electrodes, polyprolylene having Melt Index 50 (ASTM D1238-65T) was subjected to melt-blow spinning to collect a non-woven sheet of 120 g/m², the average diameter of the fibers being 2 μm, on a collecting surface (30# wire net cylindrical drum) located 25 cm away from the tip of the spinneret. The spinning conditions were as follows:

| | |
|---|---|
| Spinning Temperature | 340° C. |
| Diameter of Spinning Hole | 0.2 mm |
| Output of Polymer per Hole | 0.3 g/min |
| Number of Spinning Holes | 916 |
| Interval of Spinning Hole Centers | 1.2 mm |
| Temperature of Blown Air | 350° C. |
| Quantity of Blown Air | 20 Nm³/min |
| Angle of Blowing Direction relative to Collecting Surface | 40° |
| DC Voltage of Wire Electrode | +35 KV |
| Distance between Wire Electrode and Collecting Surface | 7 cm |
| Rotation Speed of Collecting Surface | 2.1 m/min |
| Diameter of Cylindrical Drum | 60 cm |

The wire (60 μm) electrode was disposed generally parallel to the longitudinal in the width direction of the drum. The fiber temperature on the collecting surface was 55° C.

The weight variation (CV value) was 3.1%.

For comparison, without imparting a voltage to the wire electrode, six sheets having a weight of 20 g/m² were individually produced leaving the other conditions the same. These six sheets were stacked one over another to make a laminate sheet having a weight of 120 g/m². An electric charge was then imparted to this laminate leaving the other conditions the same. However, in this case, the amount of the trapped charge of the sheet located at the inner part of the laminate sheet was much smaller than that located at the outer part.

EXAMPLE 4

Using the apparatus shown in FIG. 1, but without the needle electrode, polyprolylene was subjected to melt-blow spinning to collect a non-woven sheet of 20 g/m², the average diameter of the fibers being 2 μm, on a collecting surface (30# wire net cylindrical drum/rotation speed of 25 m/min.) located 25 cm away from the tip of the spinneret. The weight variation (CV value) was determined by two dimensional diffusion analysis, and it was 12%.

Then a needle electrode was newly provided at a point 9 cm away from the collecting surface, and a DC voltage of 140 KV was applied to the electrode. A non-woven fabric was produced in a similar manner.

The weight variation (CV Value) of the thus obtained non-woven fabric was determined to be 8%.

By observing SEM photographs of the thus obtained non-woven sheet, it was proved that the non-woven sheet was free from tangled fibers and was uniform.

The amount of the trapped electric charge was determined to be $2.0 \times 10^{-10}$ Coulomb/cm².

The efficiency with which the electret fiber sheet caught particles of an aerosol was evaluated by the method described in Example 1.

The determined particle collecting efficiency was 96.9%.

The sheet was immersed in toluene and then dried to reduce the amount of the trapped electric charge to almost zero, i.e., to $3 \times 10^{-12}$ Coulomb/cm$^2$.

The particle collecting efficiency of the sheet was then found to be 68.9%.

From the above Examples, it can be seen that a process of the invention may be used to provide an electret sheet with excellent particle collecting efficiency. It can also be seen that a non-woven sheet having uniform thickness may be produced without using an air suction apparatus.

We claim:

1. A process for producing a non-woven fiber sheet upon a moving collecting surface, said process comprising the steps of:

preparing heated molten polymer having a volume resistivity of not less than $10^{10}$ Ω·cm.;

spinning said heated molten polymer free from electric charge as spun fibers out of a spinneret upon said moving collecting surface such that said spun fibers accumulate thereupon free from a binder solution;

locating at least one electrode independent of the location of spun fibers emanating from said spinneret, wherein a distance between said at least one electrode and said spinneret prevents an electric field from being formed therebetween;

charging an electric field having a field strength of not less than 1 kv/cm upon at least said accumulating spun fibers, said electric field generated between at least one electrode and said moving collecting surface such that said accumulating spun fibers are strongly adhered upon said moving collecting surface due to said electric charge thereby improving the uniformity and increasing the density of accumulating spun fibers; and obtaining a non-woven fiber sheet from said accumulated spun fibers.

2. A process according to claim 1, which includes continuously rotatery collecting surface.

3. A process according to claim 1, wherein the collecting surface is metallic.

4. A process according to claim 1, wherein the collecting surface is provided by a metallic surface covered with a material having a volume resistivity selected from the value within a range from $10^{-3}$ to $10^9$ Ω·cm inclusive, and a value not less than $10^{12}$ Ω·cm.

5. A process according to claim 1, wherein the electric field is formed between the electrode and the collecting surface by applying a high DC voltage to the electrode and grounding the collecting surface.

6. A process according to claim 1, wherein the electric field is formed between the electrode and the collecting surface by applying to the electrode a high DC voltage of one polarity and to the collecting surface a high DC voltage of a polarity opposite to that applied to the electrode.

7. A process according to claim 1, wherein said non-woven sheet is an electret sheet.

8. A process according to claim 1, wherein said non-woven sheet is a non-electret sheet.

9. A process according to claim 8, wherein said polymer is selected from the group consisting of polyolefins, polyesters and polyamides.

10. A process according to claim 7, wherein said polymer is selected from the group consisting of polyoleins, polycarbonates and fluorine-containing polymers.

11. A process according to claim 10, wherein said said polymers is a polyolefin selected from the group consisting of polypropylene or a polyethylene.

12. A process according to claim 1, wherein the resultant electret fiber sheet has a total electric charge per unit area of at least $1 \times 10^{-10}$ Coulomb/cm$^2$.

* * * * *